(12) United States Patent
Vivanco et al.

(10) Patent No.: US 8,699,464 B1
(45) Date of Patent: Apr. 15, 2014

(54) MULTI-BAND COMMUNICATION WITH A WIRELESS DEVICE

(75) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 159 days.

(21) Appl. No.: 13/456,670

(22) Filed: Apr. 26, 2012

(51) Int. Cl.
*H04W 4/00* (2009.01)
*H04W 28/02* (2009.01)

(52) U.S. Cl.
CPC .................................. *H04W 28/0289* (2013.01)
USPC ........................................................ 370/331

(58) Field of Classification Search
USPC ........................... 370/328–339; 455/436–444
See application file for complete search history.

(56) References Cited

U.S. PATENT DOCUMENTS

| | | | |
|---|---|---|---|
| 7,848,756 B2 * | 12/2010 | Nader et al. | 455/436 |
| 8,391,918 B2 * | 3/2013 | Ekici et al. | 455/552.1 |
| 2008/0095091 A1 | 4/2008 | Surineni et al. | |
| 2010/0062760 A1 * | 3/2010 | Fuccellaro et al. | 455/426.1 |

* cited by examiner

*Primary Examiner* — Frank Duong

(57) ABSTRACT

In a system and method for multi-band communication with a wireless device, determining for a wireless device comprising a first radio associated with a first radio access technology and a second radio associated with a second radio access technology a first wake time of the first radio and a second wake time of the second radio, receiving data for an application running on the wireless device at a receive time, and sending the received data to the wireless device using one of the first radio access technology and the second radio access technology based on a first time period between the receive time and the first wake time and a second time period between the receive time and the second wake time.

16 Claims, 6 Drawing Sheets

MULTI-BAND COMMUNICATION WITH A WIRELESS DEVICE

TECHNICAL BACKGROUND

Power saving mechanisms in wireless communication systems can specify periods of time during which a wireless device enters a lower power state, such as an idle or sleep state, in which a transceiver or radio is powered down to conserve power. After each specified period of time the radio can be powered up for a brief wake duration (such as one MAC frame) to determine whether data is pending delivery to the wireless device. If no data is pending delivery, the wireless device is returned to the low power state. On the other hand, if data is pending, the wireless device is transitioned to a higher power (fully awake) state in which the radio is powered on to receive the data, and delivery of the data can be scheduled thereafter. Depending on when the data arrives for delivery to the wireless device, the timing of the sleep state can delay the delivery of the arrived data. For example, if the data arrives at the beginning of the wireless device's sleep state period, delivery of the data will be delayed until the sleep state period ends and the wireless device enters the brief wake duration.

OVERVIEW

In an embodiment, for a wireless device comprising a first radio associated with a first radio access technology and a second radio associated with a second radio access technology, determining a first wake time of the first radio and a second wake time of the second radio. Data is received for an application running on the wireless device at a receive time. Based on a first time period between the receive time and the first wake time, and on a second time period between the receive time and the second wake time, the data is sent to the wireless device using one of the first radio access technology and the second radio access technology.

DETAILED DESCRIPTION

In operation, a first wake time and a second wake time are determined for a first radio and a second radio of a wireless device. In an embodiment, the first radio and the second radio are associated with a first radio access technology and a second access technology, respectively. Data is received for an application running on the wireless device at a receive time, and a first time period between the receive time and the first wake time and a second time period between the receive time and the second wake time are determined. Based on the first time period and the second time period, one of the radio access technologies is selected to send the received data to the wireless device.

Figure 1:
FIG. 1 illustrates an exemplary communication system for multi-band communication with a wireless device.

FIG. 1 illustrates an exemplary communication system 100 for multi-band communication with a wireless device comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 can comprise a plurality of radios, each capable of communicating using a different radio access technology. Examples of a radio access technology include Global System for Mobile communications (GSM), Third Generation Partnership Project Long Term Evolution (3GPP LTE), and Worldwide Interoperability for Microwave Access (WiMAX), and others. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110. Access node 104 can be capable of communicating with wireless device 102 using a plurality of radio access technologies, including radio access technologies which may be used by the radios of wireless device 102.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

In an embodiment, for a wireless device comprising a first radio associated with a first radio access technology and a second radio associated with a second radio access technology, determining a first wake time of the first radio and a second wake time of the second radio. At a receive time, data is received for an application running on the wireless device. Based on a first time period between the receive time and the first wake time, and on a second time period between the receive time and the second wake time, the data is send to the wireless device using one of the first radio access technology and the second radio access technology.

Figure 2:
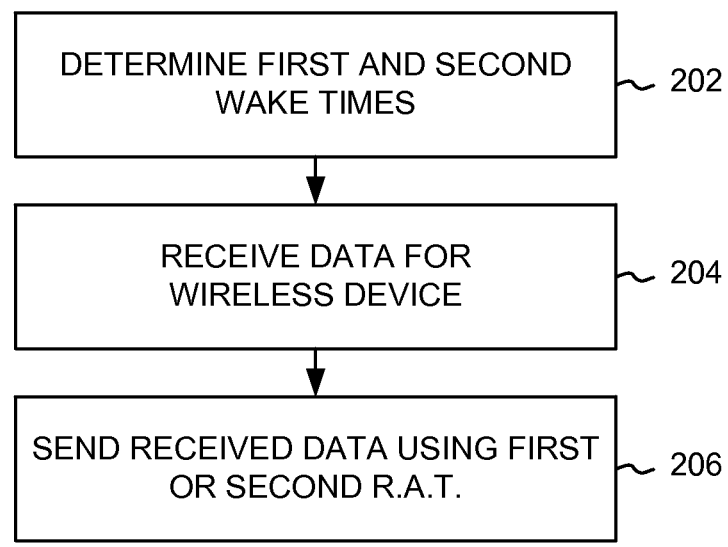
FIG. 2 illustrates an exemplary method of multi-band communication with a wireless device.

FIG. 2 illustrates an exemplary method of multi-band communication with a wireless device. In operation 202, for wireless device 102 comprising a first radio associated with a first radio access technology and a second radio associated with a second radio access technology, a first wake time is determined for the first radio and a second wake time is determined for the second radio. In an embodiment, the first radio can be designated as a primary radio, and the second radio can be designated as a secondary radio. To conserve battery power, wireless device 102 can enter a lower power state, such as an idle or sleep state, in which a radio or radios of the wireless device are powered down. For example, the radios of wireless device 102 can be put in the lower power state if data has not been received by wireless device 102 for a predetermined period of time. The radios can be powered down for a predetermined time period, after which the radios can be powered up for a brief wake duration (such as one MAC frame) to determine whether data is pending delivery to the wireless device. For example, data intended for wireless device 102 can arrive at access node 104, and if the radios of wireless device 102 are in an idle or sleep state, the data will not be delivered until at least one of the radios is powered up to check for pending data. If no data is pending delivery, the radio or radios of wireless device 102 are returned to the lower power state. On the other hand, if data is pending, wireless device 102 is transitioned to a higher power (fully awake) state in which at least one radio is powered on to receive the data, and delivery of the data can be scheduled from access node 104 to wireless device 102.

Depending on when the data arrives for delivery to the wireless device, the timing of the sleep state can delay the delivery of the arrived data. For example, if the data arrives at the beginning of a radio's sleep state period, delivery of the data will be delayed until the sleep state period ends and the wireless device enters the brief wake duration. Furthermore, each radio access technology may have a different sleep/wake schedule, such that the wake times of different radios associated with different radio access technologies may not be synchronized or otherwise align in time. Thus, different radios associated with different radio access technologies may have different wake times. In operation 202, a first wake time is determined for a first radio and a second wake time is determined for a second radio of wireless device 102.

In operation 204, data is received for wireless device 102. The data can be received, for example at access node 104, or at another network element such as a gateway, proxy node, or other similar network element. The time at which the data is received can be designated as a receive time, and can be used together with the determined first and second wake times to determine a first time period between the receive time and the first wake time, and a second time period between the receive time and the second wake time. Based on the first time period between the receive time and the first wake time and the second time period between the receive time and the second wake time, one of the first radio access technology and the second radio access technology is used to send the received data to wireless device 102 (operation 206). For example, the received data can be buffered at access node 104, or at another network element such as a gateway, proxy node, or other similar network element, until a decision is made to use the first or second radio access technology to send the data to wireless device 102. In an embodiment, the first time period may be determined to be shorter than the second time period, and accordingly the data can be sent to wireless device 102 using the first radio access technology.

Figure 3:
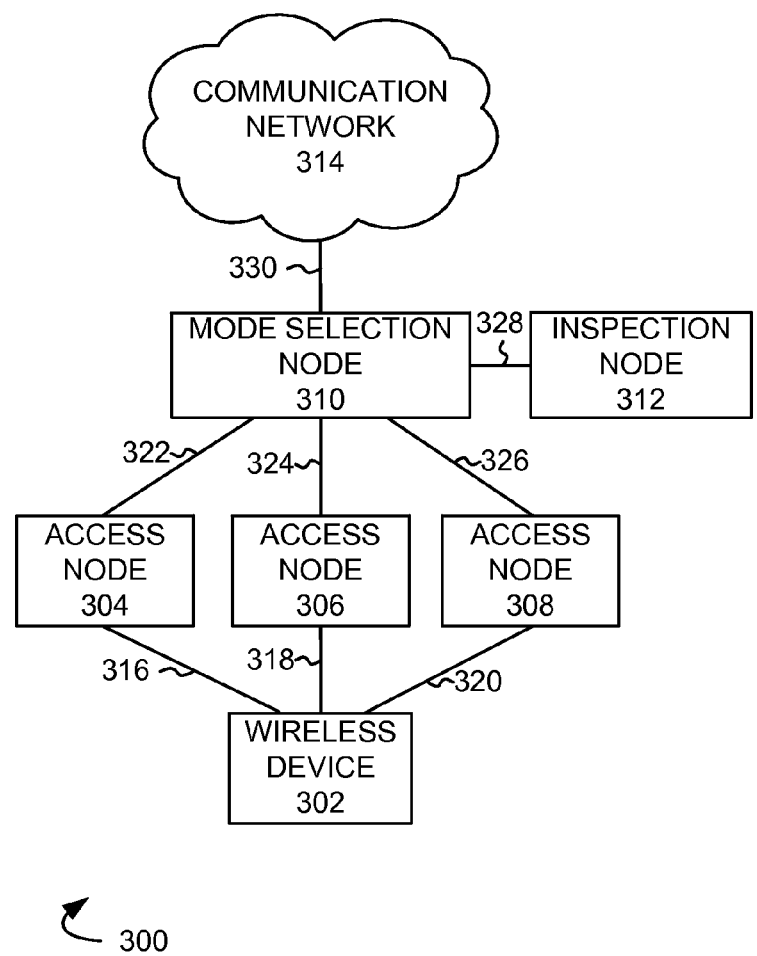
FIG. 3 illustrates another exemplary communication system for multi-band communication with a wireless device.

FIG. 3 illustrates another exemplary communication system for multi-band communication with a wireless device comprising wireless device 302, access nodes 304, 306, and 308, mode selection node 310, inspection node 312, and communication network 314. Examples of wireless device 302 can include a cell phone, a smart phone, a computing platform such as a laptop, palmtop, or tablet, a personal digital assistant, or an internet access device, including combinations thereof. Wireless device 302 can comprise a plurality of radios, each capable of communicating using a different radio access technology. Examples of a radio access technology include Global System for Mobile communications (GSM), Third Generation Partnership Project Long Term Evolution (3GPP LTE), and Worldwide Interoperability for Microwave Access (WiMAX), and others. Wireless device 302 may communicate with access nodes 304, 306 and 308 over communication links 316, 318, and 320, respectively.

Each of access nodes 304, 306 and 308 is a network node capable of providing wireless communications to wireless device 302, and can be, for example, a base transceiver station, a radio base station, an eNodeB device, or an enhanced eNodeB device. Each access node may communicate with wireless device 302 using a different radio access technology, and/or each access node may be capable of communication with wireless device 302 using a plurality of radio access technologies. Wireless device 302 may communicate with different access nodes because of a mobility of wireless device 302, based on an air interface and/or network congestion in communication system 300, based on load balancing among access nodes 304, 306 and 308, or for other reasons. Access nodes 304, 306 and 308 are in communication with mode selection node 310 over communication links 322, 324 and 326, respectively.

Mode selection node 310 is a network element which can comprise a processor and associated circuitry to execute or direct the execution of computer-readable instructions. Mode selection node 310 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Mode selection node 310 can, among other things, determine a first and second wake time of a first and second radio of wireless device 302, as well as direct the sending of data to wireless device 302 using a selected radio access technology. Mode selection node 310 can be for example, a standalone computing device or network element, or the functionality of mode selection node 310 can be included in another network element, such as a mobility management entity (MME), a gateway, a proxy node, or another network element. The functionality of mode selection node 310 can also be incorporated into, or may be distributed across, access nodes 304, 306, or 308. Access nodes 304, 306 and 308 can communicate with each other either directly or through an intermediate network element or elements to coordinate such distributed functionality. Mode selection node 310 can communicate with communication network 314 over communication link 330, and with inspection node 312 over communication link 328.

Inspection node 312 is a network element which can comprise a processor and associated circuitry to execute or direct the execution of computer-readable instructions. Inspection node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Inspection node 312 can, among other things, perform deep packet inspection of packets sent from and/or to wireless device 302. Deep packet inspection generally involves an inspection of packets beyond Open Systems Interconnection (OSI) layer 3 including an inspection of the data portion of a packet (and possibly also the header of a packet). Inspection node 312 can be for example, a standalone computing device or network element, or the functionality of mode inspection node 312 can be included in another network element, such as a mobility management entity (MME), a gateway, a proxy node, or another network element.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 may also comprise base stations, wireless communication nodes, telephony switches, internet routers, network gateways, computer systems, communication links, or some other type of communication equipment, and combinations thereof. Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Communication links 316, 318, 320, 322, 324, 326, 328, and 330 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304, 306, 308, mode selection node 310, inspection node 312, and communication network 314 which are omitted for clarity, including additional processing nodes, routers, gateways, and physical and/or wireless data links for carrying data among the various network elements.

Figure 4:
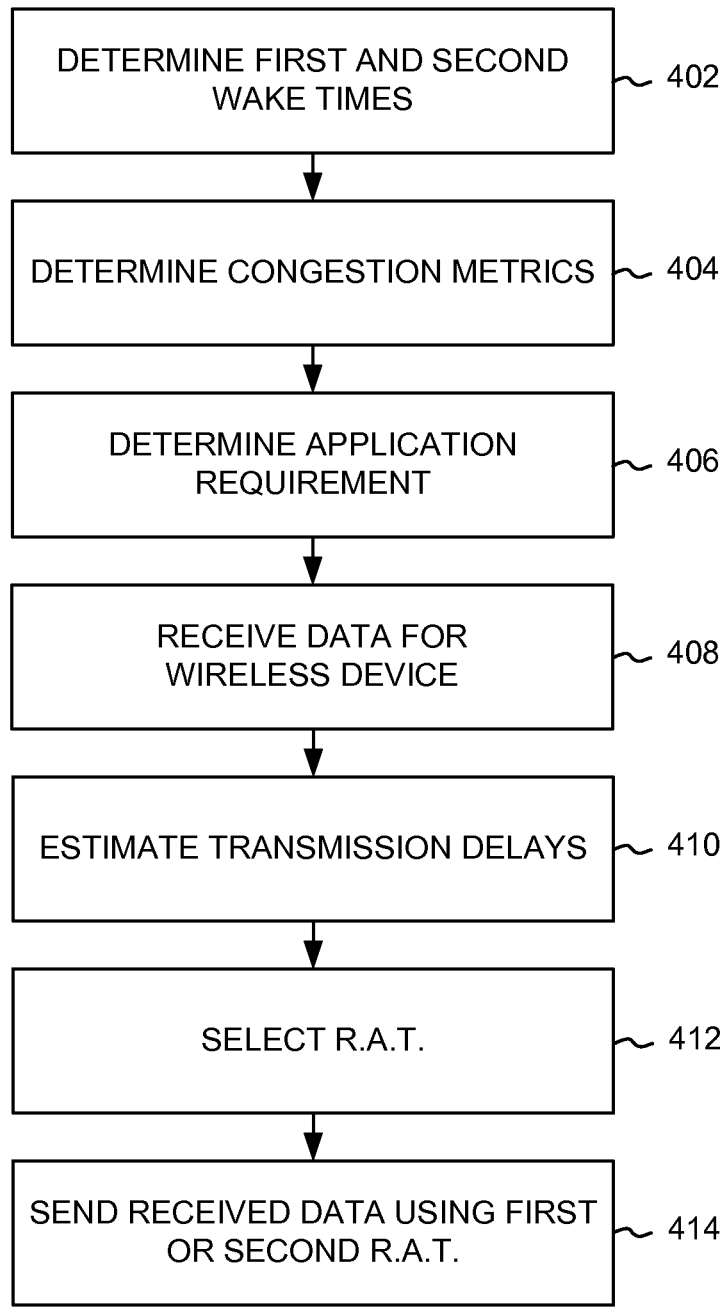
FIG. 4 illustrates another exemplary method of multi-band communication with a wireless device.

FIG. 4 illustrates another exemplary method of multi-band communication with a wireless device. In operation 402, for wireless device 302 comprising a first radio associated with a first radio access technology and a second radio associated with a second radio access technology, a first wake time is determined for the first radio and a second wake time is determined for the second radio. For example, mode selection node 310 can determine the first wake time and the second wake time by receiving indications of the radio access technologies used by wireless device 302, which can be received from access nodes 304, 306, and/or 308, from wireless device 302, from inspection node 312, or combinations thereof, and mode selection node 310 can determine the first and second wake times based on the received indications of the radio access technologies. Mode selection node 310 can also receive wake/sleep schedules associated with each radio access technology and determine the first and second wake times from the wake/sleep schedules. In addition, or alternatively, mode selection node 310 can receive the first and second wake times, for example, from wireless device 302, one or more of access nodes 304, 306 and 308, inspection node 312, or another network element.

In operation 404, congestion metrics for each of the first radio access technology and the second radio access technology are determined. The congestion metrics can include determinations of air interface congestion for each of the first and second radio access technologies (for example, over communication links 316, 318, and/or 320). The congestion metrics can also include determinations of congestion among other network elements, including between access nodes 304, 306, 308 and mode selection node 310, between mode selection node 310 and communication network 314, and/or among network elements in communication network 314.

In operation 406, an application requirement of an application running on wireless device 302 is determined. An application requirement can include at least one of a minimum data throughput and a maximum data delay required by the application running on wireless device 302. For example, a delay sensitive application (such as a voice over internet protocol (VoIP) application, or a video or audio streaming application, or the like) can require a minimum data throughput, or can tolerate a maximum data delay, to function without a degradation in performance which is apparent to a user. In an embodiment, the application requirement is determined by performing deep packet inspection on packets sent to and/or from wireless device 302, for example at inspection node 312. The application requirement can be determined at inspection node 312, or the application requirements can be determined at mode selection node 310 based on information provided by inspection node 312.

In operation 408, data is received for wireless device 302. The data can be received, for example at access node 304, 306, or 308, at mode inspection node 310, or at another network element such as a gateway, proxy node, or other similar network element. The time at which the data is received can be designated as a receive time.

In operation 410, a first transmission delay for the first radio access technology and a second transmission delay for the second radio access technology are estimated. For example, a first transmission delay for the first radio access technology and a second transmission delay for the second radio access technology can be estimated based on the first time period between the receive time and the first wake time, the second time period between the receive time and the second wake time, the application requirement and the congestion metrics for each radio access technology.

In operation 412, a radio access technology is selected to deliver the data to wireless device 302. The selection of a radio access technology can be based on the first and second transmission delays. Using the selected radio access technology, the data is sent wireless device 302 (operation 414).

Figure 5:
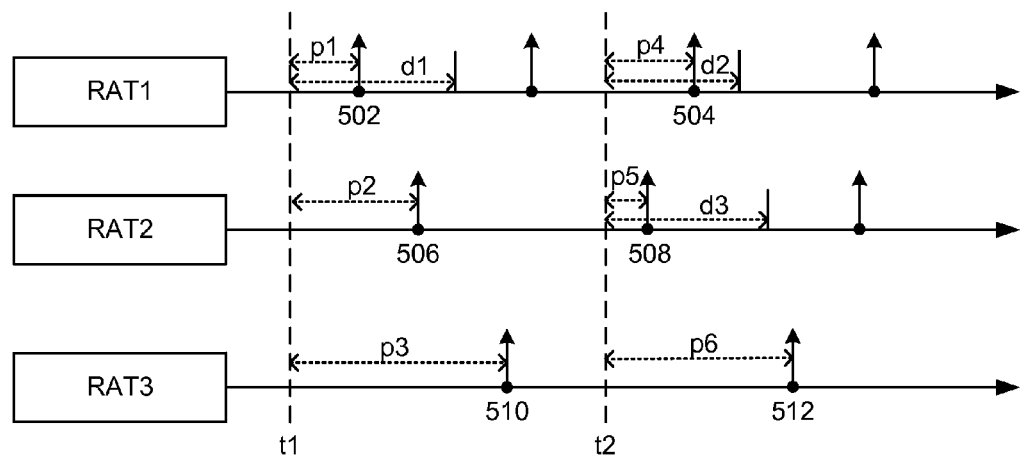
FIG. 5 illustrates an exemplary timing of sleep and wake states for radio access technologies of a wireless device.

For example, referring to FIG. 5, wakes times of three radio access technologies RAT1, RAT2 and RAT3 used by wireless device 302 are illustrated. (The number of illustrated radio access technologies is only exemplary, and wireless device 302 can use more or fewer radio access technologies.) RAT1, RAT2 and RAT3 have different wake times, for example, because the different radio access technologies may utilize different wake/sleep schedules or timers. Thus, wake times 502, 506 and 510, each for RAT1, RAT2 and RAT3, respectively, are not aligned in time. Similarly, wake times 504, 508 and 512, each for RAT1, RAT2 and RAT3, respectively, are also not aligned in time. Thus, when a packet for wireless device 302 is received at receive time t1, time periods p1, p2, and p3 can be determined for RAT1, RAT2, and RAT3, each time period corresponding with a period of time between the receive time t1 and the next expected wake time for a radio of wireless device 302 of each radio access technology (i.e., wake times 502, 506, and 510). In the case of receive time t1, time period p1 is shorter than time period p2, and time period p3 is longer than time period p2. In the case of receive time t2, time period p4 is longer than time period p5, and time period p6 is longer than time period p4.

In an embodiment, based on the determined time periods p1, p2 and p3, RAT1 may be selected to use for delivering the received data to wireless device 302 since p1 is the shortest delay time from among p1, p2, and p3. However, additional criteria may be used to select the radio access technology. For example, the application requirement of wireless device 302 may indicate that an application running on wireless device 302 is not delay sensitive (for example, an email application, or a web browsing application). In such case, RAT2 or RAT3 may be selected to deliver the data to wireless device 302, which may satisfy the application requirement of wireless device 302 and preserve resources related to RAT1.

In addition, network conditions may cause a delay in data delivery beyond the determined wake times. For example, the congestion metrics for each radio access technology may indicate that RAT1 is more congested than RAT2 and RAT3, and that a delay time of d1 for RAT1 may cause received data to be delivered to wireless device later than if RAT2 were used and the data is sent to wireless device 302 at wake time 506. In such case, RAT2 may be selected to send the received data to wireless device 302. In addition, if the application requirement indicates that an application of wireless device 302 is not delay sensitive, RAT3 may be selected despite time period p3 being longer than either time period p2 or delay time d1.

Furthermore, the selected radio access technology can be changed for each packet to be sent to wireless device 302. For example, following receive time t1, RAT2 may be selected to send the received data to wireless device 302, and following receive time t2, RAT1 may be selected to send the received data to wireless device 302. The selection of RAT1 following the receipt of data at receive time t2 can be based on, for example, a change in the congestion metrics (such as an increase in congestion affecting RAT2) and/or a change in the application requirement of wireless device 302 (for example, a change from an application which is not delay sensitive to a delay sensitive application). The application requirement of wireless device 302 can also be used to avoid ping-ponging among the available radio access technologies. For example RAT3 can be preferentially selected when wireless device 302 is running an application which is not delay sensitive, even though the received data will be sent to wireless device 302 at wake time 512, beyond either of delay time d2 or delay time d3. Selecting RAT3 may thus preserve resources related to RAT1 and RAT2.

Figure 6:
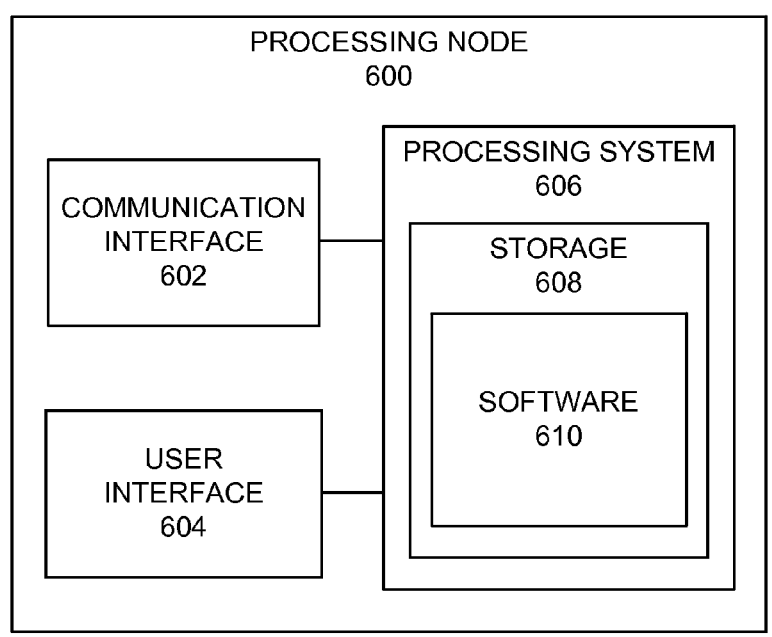
FIG. 6 illustrates an exemplary processing node.

FIG. 6 illustrates an exemplary processing node comprising communication interface 602, user interface 604, and processing system 606 in communication with communication interface 602 and user interface 604. Processing node 600 is capable of determining a link capacity between an access node and a wireless device in a wireless communication network. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes mode selection node 310. Processing node 600 can also be an adjunct or component of a network element, such as an element of access node 104, 304, 306, or 308. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of multi-band communication with a wireless device, comprising:
   determining for a wireless device comprising a first radio associated with a first radio access technology and a second radio associated with a second radio access technology a first wake time of the first radio and a second wake time of the second radio;
   receiving data for an application running on the wireless device at a receive time; and
   sending the received data to the wireless device using one of the first radio access technology and the second radio access technology based on a first time period between the receive time and the first wake time and a second time period between the receive time and the second wake time.

2. The method of claim 1, wherein sending further comprises:
   sending the received data to the wireless device using the first radio access technology when a period between the receive time and the first wake time is less than a period between the receive time and the second wake time.

3. The method of claim 1, wherein sending further comprises:
   determining a congestion metric for each of the first radio access technology and the second radio access technology; and
   sending the received data to the wireless device using one of the first radio access technology and the second radio access technology based on the congestion metrics for each radio access technology, the first time period between the receive time and the first wake time, and the second time period between the receive time and the second wake time.

4. The method of claim 3, further comprising:
   examining packets from the wireless device to determine an application requirement of an application of the wireless device.

5. The method of claim 4, wherein examining packets further comprises performing deep packet inspection of the packets from the wireless device.

6. The method of claim 4, wherein the application requirement is at least one of a minimum data throughput and a maximum data delay.

7. The method of claim 4, further comprising:
   sending the received data to the wireless device using one of the first radio access technology and the second radio access technology based on the application requirement, congestion metrics for each radio access technology, the first time period between the receive time and the first wake time, and the second time period between the receive time and the second wake time.

8. The method of claim 7, further comprising:
   estimating a first transmission delay for the first radio access technology and a second transmission delay for the second radio access technology based on the application requirement, congestion metrics for each radio access technology, the first time period between the receive time and the first wake time, and the second time period between the receive time and the second wake time; and
   sending the received data to the wireless device using the second radio access technology when the second transmission delay is shorter than the first transmission delay.

9. A system for multi-band communication with a wireless device, comprising:
   a processing node configured to
      determine for a wireless device comprising a first radio associated with a first radio access technology and a second radio associated with a second radio access technology a first wake time of the first radio and a second wake time of the second radio;
      receive data for an application of the wireless device at a receive time; and
      instruct the sending of the received data to the wireless device using one of the first radio access technology and the second radio access technology based on a first time period between the receive time and the first wake time and a second time period between the receive time and the second wake time.

10. The system of claim 9, wherein the processing node is further configured to:
    instruct the sending of the received data to the wireless device using the first radio access technology when a period between the receive time and the first wake time is less than a period between the receive time and the second wake time.

11. The system of claim 9, wherein the processing node is further configured to:
    determine a congestion metric for each of the first radio access technology and the second radio access technology; and
    instruct the sending of the received data to the wireless device using one of the first radio access technology and the second radio access technology based on the congestion metrics for each radio access technology, the first time period between the receive time and the first wake time, and the second time period between the receive time and the second wake time.

12. The system of claim 11, wherein the processing node is further configured to:
    examine packets from the wireless device to determine an application requirement of an application of the wireless device.

13. The system of claim 12, wherein the packets are examined by performing deep packet inspection of the packets from the wireless device.

14. The system of claim 12, wherein the application requirement is at least one of a minimum data throughput and a maximum data delay.

15. The system of claim 12, wherein the processing node is further configured to
    instruct the sending of the received data to the wireless device using one of the first radio access technology and the second radio access technology based on the application requirement, congestion metrics for each radio access technology, the first time period between the receive time and the first wake time, and the second time period between the receive time and the second wake time.

16. The system of claim 15, wherein the processing node is further configured to:

estimate a first transmission delay for the first radio access technology and a second transmission delay for the second radio access technology based on the application requirement, congestion metrics for each radio access technology, the first time period between the receive time and the first wake time, and the second time period between the receive time and the second wake time; and instruct the sending of the received data to the wireless device using the second radio access technology when the second transmission delay is shorter than the first transmission delay.

\* \* \* \* \*